N. F. NIEDERLANDER & R. E. ADREON.
SWIVEL PIPE JOINT.
APPLICATION FILED APR. 12, 1907.
1,015,904.
Patented Jan. 30, 1912.
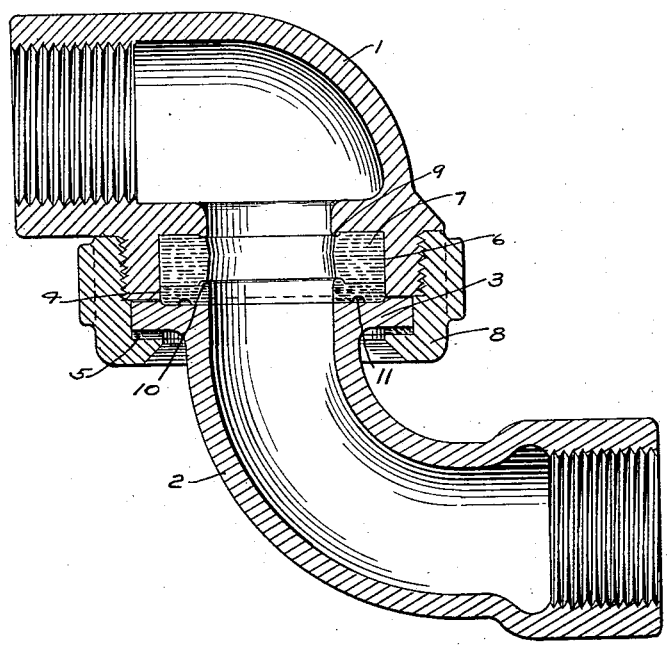
WITNESSES
INVENTORS
Nicholas F. Niederlander
Robert E. Adreon
by E. A. Wright   Att'y.

UNITED STATES PATENT OFFICE.

NICHOLAS F. NIEDERLANDER AND ROBERT E. ADREON, OF ST. LOUIS, MISSOURI, ASSIGNORS TO WESTINGHOUSE AUTOMATIC AIR & STEAM COUPLER COMPANY, OF ST. LOUIS, MISSOURI, A CORPORATION OF ILLINOIS.

SWIVEL PIPE-JOINT.

1,015,904. Specification of Letters Patent. Patented Jan. 30, 1912.

Application filed April 12, 1907. Serial No. 367,756.

*To all whom it may concern:*

Be it known that we, NICHOLAS F. NIEDERLANDER and ROBERT E. ADREON, citizens of the United States, residing at St. Louis, in the State of Missouri, have invented certain new and useful Improvements in Swivel Pipe-Joints, of which the following is a specification.

This invention relates to flexible pipe joints, and has for its object to provide an improved joint of the swivel type, adapted to be applied to pipes for transmitting air, steam, or other fluid under pressure, and especially for pipe connections and couplings between railway cars. The rubber hose and coupling connection as now used for pipes of this character is subject to various objections, owing to the liability of leakage or rupture and the frequent renewals required, while with our improved construction a permanent, safe and efficient coupling may be made, having sufficient flexibility to allow for relative movement of the cars and for the manipulation of the coupling members.

In the accompanying drawing, the figure shows in central section one form of a flexible pipe joint embodying our invention.

As shown in the drawing, the construction comprises two coupling members or pipe sections, 1 and 2, one of which has an annular flange 3. The opposite faces of the flange constitute bearing surfaces for bearing washers, or gaskets, 4 and 5. The other coupling member 1, has an annular chamber 6 extending inwardly from the joint face of said member, and contains a packing ring 7, preferably soft rubber under compression.

One of the bearing washers 4 may be conveniently located in the outer end portion of the chamber 6, the packing ring and washer being of such thickness that the washer projects slightly beyond the joint face of the member 1, allowance being made for the compression of the packing ring 7 when the parts are clamped in position. The flange 3 is preferably recessed to contain the bearing washer 4.

The coupling member 1 is exteriorly screw threaded for a gland or nut 8, so that when the gland is screwed up the parts are clamped in position. In order to prevent contact of the metallic surfaces of the gland 8 and the flange 3, and to reduce the friction, it is preferable to insert the washer or gasket 5 therebetween.

The bearing washers are composed of hard non-metallic material, such as Vulcabeston or the like, and the washer 4 may have an annular groove or recess 11 in its bearing face, which is filled with plumbago, for the purpose of lubricating the joint and increasing the efficiency thereof. The other bearing washer 5 may also be provided with plumbago or other lubricant on its bearing surface.

The inner peripheral edge of the chambered portion of the member 1 is preferably provided with a retaining lip, or ledge, 9, and a similar lip 10 is provided on the bearing washer 4 for the purpose of retaining the packing ring edges when the ring is compressed.

The section 2 may be readily rotated, the flange 3 turning between the bearing washers 4 and 5. The plumbago acts as a lubricant and fills the crevices in the bearing surface, so that leakage is prevented and a smooth bearing is secured.

The gasket or joint packing ring 4 is firmly pressed to its seat by the soft rubber packing ring 7, which in addition to being compressed during the assembling of the joint, is also subjected to the fluid pressure transmitted through the coupling, on one side, being compressed on two other sides by the walls of the pipe section 1 and on the fourth side by the hard gasket 4. The action of the fluid pressure on the packing ring 7 materially assists in maintaining a joint, as the force exerted thereby, in addition to that secured by the initial compression of the rubber, causes the ring 4 to follow up and compensate for any wear which may take place in the ring 5, flange 3, or in the gasket 4. This automatic compensation for internal wear of the joint obviates frequent hand adjustment and renewals of packing.

Having now described our invention, what we claim as new and desire to secure by Letters Patent, is:—

1. A flexible pipe joint, comprising two coupling members, one having a chamber containing a soft rubber packing ring, and the other having an annular flange, a gland for clamping the parts in position, a bearing washer intermediate the packing ring and flange, and a bearing washer intermediate the flange and gland, said bearing washers being provided with a lubricating material.

2. A flexible pipe joint, comprising two coupling members, one having a chamber containing a soft rubber packing ring, and the other having an annular flange, a bearing washer intermediate the flange and said packing ring, the bearing washer and said chambered member having annular retaining lips for retaining said packing ring in position, and a gland for clamping the parts in position and compressing said packing ring.

In testimony whereof we have hereunto set our hands.

NICHOLAS F. NIEDERLANDER.
ROBERT E. ADREON.

Witnesses:
F. G. WILLIAMSON,
D. BAILEY, Jr.

Copies of this patent may be obtained for five cents each, by addressing the "Commissioner of Patents, Washington, D. C."